Oct. 30, 1934. N. STATHAM Re. 19,356
ADJUSTABLE FASTENING DEVICE
Original Filed Oct. 1, 1927
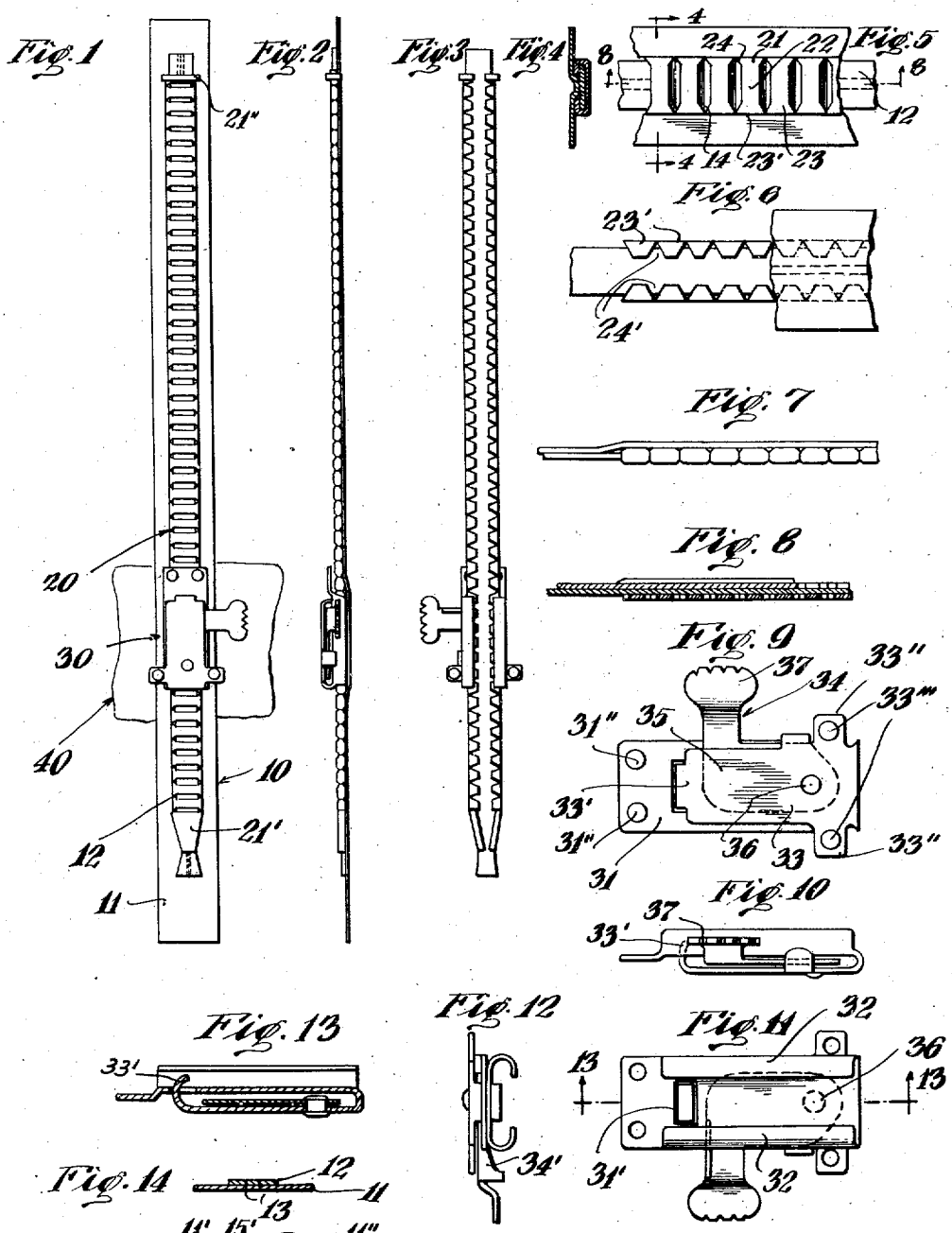
Inventor
Noel Statham
By his Attorney
Edward M. Evarts Reissued Oct. 30, 1934

Re. 19,356

UNITED STATES PATENT OFFICE 19,356

ADJUSTABLE FASTENING DEVICE

Noel Statham, Irvington-upon-Hudson, N. Y.

Original No. 1,838,463, dated December 29, 1931, Serial No. 223,254, October 1, 1927. Application for reissue December 26, 1933, Serial No. 704,032

20 Claims. (Cl. 24—206)

My present invention relates to means for adjustably fastening two articles or two parts of the same article, i. e., fastening devices which consist of two elements which are adapted to be locked together in a plurality of different relative positions. More particularly, my invention relates to fasteners of the class described, in which one of the elements (constituting a track) is substantially flexible and the other element (constituting a slider or locking member) is adapted to be locked thereto at any one of a plurality of different positions.

One object of the present invention is to provide a track of so flexible a character that it may be firmly fixed in the face of a belt, garter, suspender or other leather or fabric article without diminishing the normal flexibility of such an article to a harmful or substantial extent. Another object is to provide a slider which is adapted to travel longitudinally of such a track for the purpose of obtaining different degrees of adjustment or tensioning, to be locked to said track at any predetermined point, and to be unlocked therefrom at will for further movement along said track or even for complete removal therefrom. Another object is to provide said track with metallic elements for the purpose of positively engaging said slider when in locked position and for the purpose of avoiding abrasion or other injury to the non-metallic parts of the member to which said elements are affixed, without sacrificing the flexible character of such member.

Other objects are to provide a device of the class described which is readily, conveniently and economically fabricated and assembled, may be readily applied to a wide variety of articles in common use, may be used to hold the parts of such articles in overlapping relation, may be attractive in appearance and may replace devices heretofore employed for the same general purpose but which fail to accomplish some of the objects above described.

The devices of the present invention avoid or overcome these disadvantages of the devices of the prior art and possess other advantages in construction, in operation and in use which will be, in part, pointed out in detail hereinafter and will in part be obvious to those skilled in the art to which the present invention relates.

In the accompanying specification I shall describe, and in the annexed drawing show, several illustrative embodiments of the present invention. It is, however, to be clearly understood that my invention is not limited to the specific embodiments thereof herein shown and described for purposes of illustration only.

Referring to the drawing, wherein I have shown the aforesaid illustrative embodiments of the present invention:

Fig. 1 is a top plan view showing said embodiment;

Fig. 2 is an edge view showing said embodiment;

Fig. 3 is a bottom plan view of the auxiliary tape portion or track with the slider in position thereon forming a part of said embodiment;

Fig. 4 is a cross-sectional view taken along line 4—4 of Fig. 5 of the drawing;

Fig. 5 is a fragmentary detailed top plan view on an enlarged scale illustrating the method of attaching the engaging elements to the flexible supporting member;

Fig. 6 is a fragmentary detailed bottom plan view on an enlarged scale illustrating the method of attaching the engaging elements to the flexible supporting member;

Fig. 7 is a fragmentary detailed edge view on an enlarged scale showing the engaging elements as applied to the flexible supporting member;

Fig. 8 is a longitudinal sectional view taken along line 8—8 of Fig. 5 of the drawing;

Fig. 9 is a top plan view on an enlarged scale of the slidable locking and unlocking means forming a part of the aforesaid illustrative embodiment of the present invention;

Fig. 10 is a side elevation on an enlarged scale showing the slidable locking and unlocking member illustrated in Fig. 9 of the drawing;

Fig. 11 is a bottom plan view on an enlarged scale showing said slidable locking and unlocking member;

Fig. 12 is an end view on an enlarged scale showing said locking and unlocking member;

Fig. 13 is a longitudinal sectional view of the same taken along line 13—13 of Fig. 11 of the drawing;

Fig. 14 is a cross-sectional view of the flexible supporting member taken along line 14—14 of Fig. 5 of the drawing; and Fig. 15 is a similar view of a modified form of flexible supporting element.

Referring now to the aforesaid illustrative embodiments of the present invention, and with particular reference to the drawing illustrating the same, I employ in said embodiments a flexible supporting member, preferably in the form of a tape made of fabric or other suitable flexible material. This tape may either be a single tape to which the engaging elements of the present invention may be suitably directly secured, as by riveting, clipping or the like, or may be in the form of a composite tape consisting of a main supporting tape and an auxiliary supporting tape to the latter of which the engaging elements of the present invention may be similarly suitably secured, or else it may be in the form of a pseudo-composite tape made by suitably folding a single width of tape so as to provide a substantially central engaging element supporting portion.

I may, for example, employ the type of flexible supporting member illustrated in the drawing and there generally designated by reference character 10 and comprising the main supporting tape member 11 and the auxiliary supporting tape member 12. The auxiliary supporting tape member 12 is preferably of lesser width than the main supporting tape member 11 and is preferably attached thereto, for example substantially centrally thereof, by one or more lines of stitching 13. It may here be stated that the auxiliary tape member 12 may be attached to the main tape member 11 either before or after the engaging elements have been applied thereto. Usually the attaching operation is carried out before such engaging elements are applied to the auxiliary tape member 12.

In place of the composite tape shown in detail in Fig. 14 of the drawing, I may employ the types of composite tapes shown in Fig. 15 of the drawing and there generally indicated by reference character 10′. As there illustrated I employ a plurality of main tape portions 11′ to which the auxiliary tape portion 12′ may be suitably secured by means of the lines of stitching 13′ and 13″. It will be noted that the auxiliary tape portion 12′ is itself folded over so as to provide the lower inwardly turned tape portions 14′ and 14″ through which, as well as through the central portion 15′ of the auxiliary tape portion 12′, the lines of stitching 13′ and 13″ pass.

In other words, the flexible supporting member comprises what may be termed a main body portion, such as the main tape member 11 in Fig. 14 of the drawing, or the cooperating main tape members 11′ and 11″ in Fig. 15 of the drawing, and an engaging element supporting portion, for example, the auxiliary tape member 12 in Fig. 14 of the drawing or the auxiliary tape member 12′ in Fig. 15 of the drawing. It will also be seen that the engaging-element supporting portion is located substantially centrally of the main body portion of the flexible supporting member. By that I mean that the engaging-element supporting portion is so positioned with relation to the main body portion that it is equidistant from each of the side edges of the main body portion. However, such engaging-element supporting portion may be located at either or both margins of the flexible supporting member, as desired.

I provide the flexible supporting member with a plurality, or series of engaging elements, so called because they are intended to engage, and accordingly to be engaged by, the slidable locking and unlocking member or operating means described in detail later in this specification. I prefer that the series of engaging elements here generally designated by reference character 20, shall be articulated, that is, I prefer that the series of engaging elements shall be so arranged as not substantially to diminish the flexible character of the flexible supporting member. To some extent of course such flexibility is reduced, but the reduction in flexibility should preferably not be such as to deprive the device of its general flexible character, any loss in the flexible character of the device being compensated for by the increased strength of the device, the engaging elements serving in a sense as an armor for the flexible supporting member.

While a wide variety of engaging elements coming within the spirit of the present invention, as defined in the appended claims, may be used for the purposes of the present invention, I may, for example, employ the type of engaging elements shown in Figs. 1 to 8, inclusive, of the drawing and comprising, for example, a series of clips 21 having the central relatively narrow portions 22 and the substantially hexagonal end portions 23. These latter should be of a size sufficient to permit their end marginal portions 23′ to be clipped or bent under the free edges of the engaging-element supporting portions 12, in Fig. 14 of the drawing, or 12′, in Fig. 15 of the drawing. By "free edges" are meant the laterally projecting flanges of the track or tape 12 or 12′ which result from the fact that the same is connected to the main tape portion 11 only along a central longitudinal line or lines intermediate of such edges, as shown in the drawing.

It will be noted that between each pair of engaging elements 21 there is provided a substantially hexagonal or other space 24 which provides convenient means for receiving the operative element or member of the slidable locking and unlocking means described later in this specification. It may here be stated, however, that instead of a space 24, a perforation may be employed or other means utilized for bringing about the desired result, all within the spirit of the present invention as defined in the appended claims. It may here further be stated that the shape of the engaging element 21 may be varied within a wide range, and the same may be provided with projections or hooks or other means for suitably engaging the operating element or member of the locking and unlocking means of the present invention, without departing from the spirit thereof. It will be noted also that between each pair of clipped under end portions 23′ of the engaging elements 21, there is a substantially triangular space 24′. The provision of the spaces 24 and 24′, or their equivalents, serves to increase the flexibility of the series of what may be termed articulated engaging elements 21. It may here further be stated that while, as shown in Figs. 1 to 8, inclusive, of the drawing the engaging elements 21 are virtually in contact along the edges of the engaging-element supporting portion 12, they may be spaced from each other without coming into contact. However, either arrangement may be employed, depending on the particular specific result had in mind.

The series 20 of engaging elements 21 may be applied to a particular portion of the flexible supporting member 10 which may constitute, as already indicated, either a belt, garter, a portion of a pair of suspenders, or the like. Associated with another portion of the flexible supporting member 10, or, if so desired, associated with a separate but cooperating flexible supporting member, are means, generally indicated by reference character 30, for providing locking and unlocking means whereby the desired adjustment in length of the flexible supporting member 10, whether the same is a belt, garter, pair of suspenders or the like, may readily be effected.

I prefer that the means 30 shall be freely movable in one direction along the series 20 of engaging elements 21, which series provides a sort of track for the slidable means 30. I prefer also that in its opposite direction of movement along the series 20 of engaging elements 21 the slidable means 30 shall be such as normally to resist movement in such opposite direction by reason of the engagement of the operating member or element of the slidable means 30 with one or more of the engaging elements 21 particularly within one of the spaces 24 of the series 20 of engaging elements 21. I prefer also that the slidable operating means 30 shall be provided with means to release or remove the operating member or element from the space 24 or its equivalent so as to permit the free sliding movement of the slidable means 30 in said opposite direction, in order to permit the convenient adjustment in length of the device.

While a wide variety of slidable means 30 may be employed, constructed in different sizes, all within the spirit of the present invention as defined in the appended claims, I may utilize the construction illustrated more particularly in Figs. 9 to 13, inclusive, of the drawing and comprising a main body portion 31 provided on its under surface with the channel portions 32 for receiving the marginal edges of the engaging elements 21 carried by the engaging-element supporting tape 12 and for receiving the flanges of tape 12. The slidable means 30 are further provided with the portion 33, which may be but is not necessarily a spring portion having the transversely turned portion 33′, the inner end of which provides the locking element or member of the slidable means 30 of the present invention. The member 33′ may pass into and be received by the slot 31′ in the main body portion 31. The portion 33 is provided with the lugs or ears 33″ provided with the apertures or perforations 33‴, the main body portion 31 being likewise provided with the apertures or perforations 31″. The perforations 31″ and 33‴ are provided in order to permit the ready attachment of the slidable member 30 to the other portion of the flexible supporting member 10 or its equivalent.

I prefer that the portions 31, 32, 33 and 33′ shall be made of a single strip of metal, preferably of spring metal. I prefer also that the relation of the parts 31 and 33 shall be such that, due to the spring action of the part 33, the locking projection 33′ shall normally extend through the slot 31′ and thus tend to extend into one of the spaces 24. I provide means, generally designated by reference character 34, for overcoming this normal spring tendency of the locking portion 33″ to enter into and be positioned securely within one of the spaces 24. While various means may be employed for this purpose, I prefer to use the means illustrated in the drawing and comprising a main body portion 35 pivoted, as at 36, by means of a pin or rivet which passes through the portions 31 and 33 and which has the serrated or otherwise suitably shaped projecting tab or other manipulating member 37, all as more clearly shown in Figs. 9 and 11 of the drawing.

In order to provide means for overcoming the spring tension of the member 33 with respect to the member 31 so as to lift the locking projection 33′ out of the particular space 24 in which said locking projection may at the time be engaged, I provide the main body portion 35 of the means 34 with the substantially wedge-shaped transversely disposed portion 34′ so positioned that, upon the rotation of the member 34 about the pivot 36 in one direction, a portion of the wedge-shaped member 34′ will be forced inwardly between the members 31 and 33, thus to spread the same apart and thus to lift the locking portion 33′ out of the space 24. In its opposite direction of rotation, the wedge-shaped portion 34′ will be moved outwardly from between the members 31 and 33, thus permitting the member 33 carrying the locking projection 33′ to resume its normal position in one of the spaces 24.

It may here be stated that due to the spring tendency of the members 31 and 33 to come together, the means 34′ will be restored to normal position without any positive rotational movement of such means by the person using the device. It may here further be stated that the shape of the locking portion 33′ is such, as by rendering the same curved or hook-shaped, as clearly shown in the drawing, that is one direction of movement of the slidable member 30, the locking projection 33′ will pass freely with a sliding contact over the engaging elements 21, while in the opposite direction of its movement, the slidable means 30 will normally tend to be locked with the curved or hook-shaped locking projection 33′ in one of the spaces 24. This normal tendency, due, in this instance, to the spring nature of the members 31 and 33, may, as already indicated above, be overcome by the suitable manipulation of the means 34 in the manner already suggested above.

This completes the description of the aforesaid illustrative embodiment of the present invention. The construction of said embodiment will, it is believed, be sufficiently clear from the foregoing description. Likewise, the manner of assembling said embodiment will, it is believed, be similarly clear from the foregoing description. The manner of applying said embodiment and of operating the same will, it is believed, be sufficiently clear from the foregoing description but may be briefly summarized as follows:

Assuming that the main and auxiliary tape portions 11 and 12, for example, or 11′, 11″ and 12′, as the case may be, have been sewn together or otherwise suitably attached to each other, the engaging elements 21 may now be applied to the engaging-element supporting portion 12 or 12′, as the case may be, by clipping under the end portions 23′ of such engaging elements, thus providing the series of spaces 24 on one side of the flexible supporting device and the two series of spaces 24′ on the other side of such flexible supporting device. As already stated, the engaging elements 21 may be in contact at their marginal portions or may be spaced so as to clear each other. In any event, the armored tape will also be quite flexible and the engaging elements will provide a track for guiding the slidable operating member.

The tape 10 carrying the series of engaging elements 20 may be sold as such for application to the different devices with which it is to be used or may be attached directly by the manufacturer to such devices. Such attachment may be by affixing the tape 10 bearing the track upon the surface of an article to which the device is to be applied, a fragment of such article being represented in Fig. 1 by reference character 40. It is not necessary to the operation of the device that any part of the track be wholly free from the tape 10 or that any part of tape 10 be free from the surface of the article to which the track and tape are affixed. For this reason the device is adapted for use where two parts are to be held in overlapped relation. It may here be stated that I provide a tapered member 21′ in the nature of an engaging element adjacent the receiving end of the device so that the same may readily be threaded into the corresponding channel members 32 of the slidable operating member 30. At the other end of the series 20 of engaging elements 21 I may provide the locking clip 21″ which will prevent the slidable operating member 30 and the flexible portion of the member to which it is attached from being operated too far.

As already indicated above, the supporting member 10 and the series 20 of engaging elements 21 carried thereby may be attached, as by stitching or riveting, for example, to one portion of the article with which the device of the present invention is to be used, for example, a belt, garter, pair of suspenders or like article. Either carried by another portion of the article or on a separate but cooperating supporting member is carried the slidable operating member 30 which may be suitably riveted or otherwise securely attached to the member carrying the same. It is to be understood that this invention operates in precisely the same manner whether the parts to which the track and slider are respectively attached are parts of the same article or are separate articles intended for adjustable attachment through the medium of the device. Where the claims hereinafter set forth speak of "adjusting the effective length of a flexible member" or "a portion of said flexible supporting member" or equivalent phrases, I mean to include instances where the track and slider of my device are attached to parts of otherwise separate articles for adjustable connection with each other, as well as cases where these parts, as in a belt, are themselves otherwise united.

In adjusting the length of the article the channels 32 of the slidable operating member 30 are threaded over the tapered element 21′ and thus onto the series 20 of engaging elements 21. The desired adjustment may readily be effected in view of the shape of the locking portion 33′ which permits the free sliding movement of the slidable member 30 along the series 20 of engaging elements 21 in a direction to shorten the article. Once this adjustment has been effected any effort to lengthen the article will normally be resisted by the engagement of the locking portion 33′ in one of the spaces 24. This normal locking tendency may be overcome by the rotation of the member 34 in the manner already described above, whereupon the slidable member 30 may be moved along the series 20 of engaging elements 21 to lengthen the article. In any desired position of the parts, the spring action of the members 31 and 33 will act to maintain the device in its adjusted position against any tendency to lengthen the same except when the member 34 is operated to permit the desired lengthening action.

This completes the description of the mode of operation and of use of the aforesaid illustrative embodiment of the present invention. It will be noted that the device is simple in construction, and may be readily, conveniently and economically fabricated and assembled. In use, the device is characterized by the wide range of usefulness and the wide variety of articles to which it may successfully be applied for conveniently and accurately increasing or diminishing the length of such articles and maintaining such articles in their adjusted position as to length. Other advantages and superiorities of the devices of the present invention will readily occur to those skilled in the art to which the present invention relates.

What I claim as my invention is:

1. Means for adjusting the effective length of a flexible member comprising a flexible supporting member and a series of individual stops carried by a portion of said flexible supporting member, said stops presenting a track, in combination with a slidable member carried by another portion of said flexible supporting member and adapted to slide over the track presented by said series of stops for selective engagement with the same.

2. Means for adjusting the effective length of a flexible member comprising a flexible supporting member and an articulated series of stops carried by a portion of said flexible supporting member and so arranged thereon as not substantially to interfere with the flexible character of said flexible supporting member, said stops presenting a track, in combination with a slidable member carried by another portion of said flexible supporting member and adapted to slide over the track presented by said series of stops for engagement with certain of the same.

3. Means for adjusting the effective length of a flexible member comprising a flexible supporting member and an articulated series of metallic stops carried by a portion of said flexible supporting member and so arranged thereon as not substantially to interfere with the flexible character of said flexible supporting member, said stops presenting a track, in combination with a slidable member carried by another portion of said flexible supporting member and adapted to slide over the track presented by said series of stops for engagement with certain of the same.

4. Means for adjusting the effective length of a flexible member comprising a flexible supporting member and an articulated series of spaced, substantially centrally longitudinally disposed metallic engaging elements attached to a portion of said flexible supporting member and so arranged thereon as not substantially to interfere with the flexible character of said flexible supporting member, said engaging elements presenting a track, in combination with a slidable member carried by another portion of said flexible supporting member and adapted to slide over the track presented by said series of engaging elements for engagement with certain of the same.

5. Means for adjusting the effective length of a flexible member comprising a flexible supporting member and an articulated series of metallic engaging elements carried by a portion of said flexible supporting member and so arranged thereon as not substantially to interfere with the flexible character of said flexible supporting member, said engaging elements presenting a track, in combination with a slidable member carried by another portion of said flexible supporting member and having a portion thereof adapted in one direction of its sliding movement to slide freely over the track presented by said series of engaging elements for engagement with certain of the same and in the opposite direction normally to resist sliding movement over the track presented by said series of engaging elements by its engagement with said certain of said engaging elements.

6. Means for adjusting the effective length of a flexible member comprising a flexible supporting member and a series of separate and distinct engaging elements carried by a portion of said flexible supporting member, said engaging elements presenting a track, in combination with a slidable member carried by another portion of said flexible supporting member and adapted in one direction of its sliding movements to slide freely over the track presented by said series of engaging elements for engagement with certain of the same and in the opposite direction normally to resist sliding movement over the track presented by said series of engaging elements by its engagement with said certain of said engaging elements.

7. Means for adjusting the effective length of a flexible member comprising a flexible supporting member and an articulated series of spaced, substantially centrally longitudinally disposed metallic engaging elements attached to a portion of said flexible supporting member and so arranged thereon as not substantially to interfere with the flexible character of said flexible supporting member, said engaging elements presenting a track, in combination with a slidable member carried by another portion of said flexible supporting member and adapted in one direction of its sliding movement to slide freely over the track presented by said series of engaging elements for engagement with certain of the same and in the opposite direction normally to resist sliding movements over the track presented by said series of engaging elements by its engagement with said certain of said engaging elements.

8. Means for adjusting the effective length of a flexible member comprising a flexible supporting member and an articulated series of engaging elements carried by a portion of said flexible supporting member and so arranged thereon as not substantially to interfere with the flexible character of said flexible supporting member, said engaging elements presenting a track, in combination with a slidable member carried by another portion of said flexible supporting member and having a portion thereof adapted in one direction of its sliding movement to slide freely over the track presented by said series of engaging elements for engagement with certain of the same and in the opposite direction normally to resist sliding movement over the track presented by said series of engaging elements by its engagement with said certain of said engaging elements.

9. Means for adjusting the effective length of a flexible member comprising a flexible supporting member and an articulated series of spaced, substantially centrally longitudinally disposed metallic engaging elements attached to a portion of said flexible supporting member and so arranged thereon as not substantially to interfere with the flexible character of said flexible supporting member, said engaging elements presenting a track, in combination with a slidable member carried by another portion of said flexible supporting member and having a portion thereof adapted in one direction of its sliding movement to slide freely over the track presented by said series of engaging elements for engagement with certain of the same and in the opposite direction normally to resist sliding movement over the track presented by said series of engaging elements by its engagement with said certain of said engaging elements, said slidable member being provided with means for permitting the same to pass freely over the track presented by said engaging elements in said opposite direction of its movement thereover.

10. Means for adjusting the effective length of a flexible member comprising a flexible supporting member and an articulated series of metallic engaging elements carried by a portion of said flexible supporting member and so arranged thereon as not substantially to interfere with the flexible character of said flexible supporting member, said engaging elements presenting a track, in combination with a slidable member carried by another portion of said flexible supporting member and having a portion thereof adapted in one direction of its sliding movement to slide freely over the track presented by said series of engaging elements for engagement with certain of the same and in the opposite direction normally to resist sliding movement over the track presented by said series of engaging elements by its engagement with said certain of said engaging elements, said slidable member being provided with means for permitting the same to pass freely over the track presented by said engaging elements in said opposite direction of its movement thereover.

11. Means for adjusting the effective length of a flexible member comprising a flexible supporting member and an articulated series of engaging elements carried by a portion of said flexible supporting member and so arranged thereon as not substantially to interfere with the flexible character of said flexible supporting member, said engaging elements presenting a track, in combination with a slidable member carried by another portion of said flexible supporting member and having a portion thereof adapted in one direction of its sliding movement to slide freely over the track presented by said series of engaging elements for engagement with certain of the same and in the opposite direction normally to resist sliding movement over the track presented by said series of engaging elements by its engagement with said certain of said engaging elements, said slidable member being provided with means for permitting the same to pass freely over the track presented by said engaging elements in said opposite direction of its movement thereover.

12. Means for adjusting the effective length of a flexible member comprising a flexible supporting member and a series of separate and distinct engaging elements carried by a portion of said flexible supporting member, said engaging elements presenting a track, in combination with a slidable member carried by another portion of said flexible supporting member and adapted in one direction of its sliding movement to slide freely over the track presented by said series of engaging elements for engagement with certain of the same and in the opposite direction normally to resist sliding movement over the track presented by said series of engaging elements by its selective engagement with said engaging elements, said slidable member being provided with means for permitting the same to pass freely over the track presented by said engaging elements in said opposite direction of its movement thereover.

13. In a device of the class described for adjustably fastening two parts in a plurality of relations, in combination a flexible member having laterally projecting flanges mounted upon one part and a locking member affixed to the other part and having means cooperating with said flanges and an element pivoted on said locking member for movement with respect thereto, said locking member being freely movable into and out of engagement with various parts of said first named member when said element is in one position and being held in engagement therewith when said element is in another position.

14. In a device of the class described for adjustably fastening two parts in a plurality of relations, in combination a flexible track attached to one of said parts and a slider only partly surrounding said track and affixed to the other part, said track having flanges and said slider having means cooperating with said flanges and adapted to permit said slider to move longitudinally upon one face of said track and a member mounted upon said slider and movable with respect to the same to check said longitudinal movement of the slider.

15. In a device of the class described for adjustably fastening two parts in a plurality of relations, in combination a flexible track mounted upon the face of one part by attachment thereto at a plurality of points longitudinally of said track and a slider only partly surrounding said track and affixed to the other part, said track having flanges and said slider having means cooperating with said flanges and adapted to permit said slider to move longitudinally of said track and a member mounted upon said slider and movable with respect to the same to check said longitudinal movement of the slider.

16. In a device of the class described for adjustably fastening two parts in a plurality of relations, in combination a flexible track mounted upon the face of one part and a slider only partly surrounding said track and affixed to the other part, said track having flanges and said slider having means cooperating with said flanges and adapted to permit said slider to move longitudinally only of said track and a member mounted upon said slider and movable with respect to the same to check said longitudinal movement of the slider.

17. In a device of the class described for adjustably fastening two parts in a plurality of relations, in combination a flexible base having a series of rigid stops separately mounted thereon in spaced relation, said stops being provided with projecting flanges, and a locking member affixed to the other part and having means cooperating with said flanges and an element pivoted on said locking member and movable with respect thereto, said locking member being adapted to engage one of said stops when said element is in one position and to release said stop when said element is moved to another position.

18. In a device of the class described for adjustably fastening two parts in a plurality of relations, in combination a flexible track mounted upon one part and a slider affixed to the other part, said track comprising a flexible base and metallic elements separately affixed thereon, said metallic elements forming a series longitudinally aligned and having laterally projecting shoulders, and said slider having means cooperating with said shoulders and adapted to permit said slider to move longitudinally of said track and a member mounted upon said slider and movable with respect to the same to check said longitudinal movement of the slider.

19. In a device of the class described for adjustably fastening two parts in a plurality of relations, in combination a track mounted upon one part and a slider affixed to the other part, said track comprising a flexible base and rigid elements mounted thereon and movable with respect to each other and providing a series of longitudinally aligned stops, said elements having laterally projecting shoulders, and said slider having means cooperating with said shoulders and adapted to permit said slider to move longitudinally of said track, and a member mounted upon said slider and movable with respect to the same for contact with said stops to check said longitudinal movement of the slider.

20. In a device of the class described for adjustably fastening two parts in a plurality of relations, in combination a flexible member having its under surface permanently attached throughout its effective length to one of said parts and having its upper surface constituting a flanged track and a slider affixed to the other of said parts and having means cooperating with said flanges to permit said slider to move longitudinally of said track and a member mounted upon said slider and movable with respect to the same to check said longitudinal movement of the slider.

NOEL STATHAM.